United States Patent [19]

Moodie

[11] 4,140,375
[45] Feb. 20, 1979

[54] IDLER ROLLER MOUNTING ARRANGEMENT FOR SOUND MOTION PICTURE FILM HANDLING CASSETTE

[75] Inventor: Donald E. Moodie, Marblehead, Mass.

[73] Assignee: Polaroid Corporation, Cambridge, Mass.

[21] Appl. No.: 756,624

[22] Filed: Jan. 4, 1977

[51] Int. Cl.² ............................................. G03B 23/02
[52] U.S. Cl. .................................. 352/130; 352/78 R
[58] Field of Search ...................... 352/72, 130, 78 R

[56] References Cited

U.S. PATENT DOCUMENTS

| 3,544,205 | 12/1970 | Bogdanowicz | 352/72 |
| 3,867,021 | 2/1975 | Mueller | 352/72 |
| 3,905,690 | 9/1975 | Scholz | 352/72 |

Primary Examiner—Monroe H. Hayes
Attorney, Agent, or Firm—Frederick A. Goettel, Jr.

[57] ABSTRACT

A mounting arrangement is provided for supporting an idler roller which is adapted to backup a constant speed drive capstan in a multipurpose photographic film cassette having a sound capability. The roller support includes a C-shaped bracket having an intermediate leg and upper and lower legs which extend respectively above and below the roller and which are provided with openings to receive and support a mounting pin which extends through a central opening in the roller. The lower leg is attached to a sidewall of the housing and the upper leg is provided with an extension which is adapted to engage a structural portion of the cassette in a manner to resist the force imparted to the upper end of the idler roller mounting pin by the drive capstan.

7 Claims, 5 Drawing Figures

IDLER ROLLER MOUNTING ARRANGEMENT FOR SOUND MOTION PICTURE FILM HANDLING CASSETTE

BACKGROUND OF THE INVENTION

This invention relates generally to motion picture photography and, more particularly, to an improved mounting arrangement for an idler roller in a multipurpose sound motion picture film handling cassette against which a constant speed drive capstan biases said film strip.

The present invention is directed to a roller mounting arrangement particularly useful in connection with photographic film cassettes from which the film strip need not be removed during the exposure, processing and projection operations and, more particularly, to film cassettes of the type which include internally programmed film processing systems. Exemplary of such systems are those described in the commonly assigned U.S. Pat. No. 3,785,727 of John F. Batter Jr., et al. As described in the above-referenced patent, a motion picture system has been devised by which a supply of photographic film contained in a cassette can be exposed in a camera adapted to receive the cassette and then processed, or developed, to provide the conventional series of transparent image frames in accordance with the transport of the film strip in a predetermined program.

It has also been proposed that the film strip, in addition to carrying a photosensitive area, carry a magnetic sound track affixed to or formed as a part thereof. Such film strip and magnetic track combinations have been marketed for motion picture cameras and projectors and are commonly used within the photographic art. Whether such films have the magnetic track affixed to it or formed as a part of it, recording may be carried out in either the camera or, subsequent to exposure, in a projector type arrangement in which "fill-in" or background comments are provided. When sound recording and playback occurs, both a magnetic transducer head and a constant speed drive capstan must be introduced through the cassette structure in order to contact the magnetic track portion of the film strip. A constant speed drive capstan is employed for moving the film strip and magnetic track past the transducer head at a constant speed in order to achieve a good quality of sound recording. In contradistinction to the constant speed drive of the capstan, is the incremental motion imparted to the film strip by the sprocket drive mechanism of the camera and the projector. Such mechanisms generally take the form of a claw which pulls the film by engaging sprocket holes on one or both sides of the film strip. As previously suggested, such mechanisms move the film strip along the given path of travel in a motion which is not unlike a flutter or twitch. Typically, the constant speed drive and the incremental advancement drive are isolated by formation of a slack film loop. Such a system for use in a cassette of the type described above, is illustrated and described in U.S. Pat. No. 3,921,880 entitled "Multipurpose Audio-Visual Cassette with Isolation Loop" of Donald T. Scholz.

As illustrated in the above-referenced patent, the constant speed drive system typically comprises a displaceably mounted constant speed drive capstan that selectively engages the film against a film guide roller. In cassettes of this type, the cassette housing is typically made from a molded thermoplastic material. The supporting posts for film guide rollers, film supply reels and various other internal structure of the cassette are typically integrally formed with the cassette housing and accordingly made from the same thermoplastic material.

Unlike conventional film cassettes of the type wherein the film strip is removed from the housing and processed in a laboratory, the guide rollers in a multipurpose film handling cassette of the type described hereinabove must be designed to contact the film strip only at the outer edges thereof to minimize contact with the central emulsion layer of the film strip. Consequently, such guide rollers are formed having a centrally depressed area and two stepped portions proximate the lateral edges of the film strip. Configured as such, the wet emulsion layer of the film strip following deposition of the processing fluid is isolated from contact with the idler rollers by this central depressed area. The outer edges of the film strip which are in contact with the stepped portions are not coated with the developing liquid and such contact does not affect the quality of the film strip or its image. In conventional film cassettes wherein the film strip is removed for processing, the idler roller against which the constant speed drive capstan sandwiches the magnetic track bearing portion of the film is typically provided with a resilient outer covering whereby the film strip may be positively sandwiched between the constant speed drive capstan and the idler roller with full contact of the film strip with both of these elements and in fact actual contact between the drive capstan and the surface of the idler roller. A nominal force imparted by the capstan accordingly results in good driving contact with the film strip.

In order to assure a positive constant speed drive in a multipurpose film cassette of the type described above, the drive capstan has been adapted to urge the film against the idler roller with a force on the order of 700 to 800 grams. Such force would result in the bending of the mounting post for the idler roller which serves to backup the constant speed drive capstan, resulting in undesirable skew driving of the film strip therethrough. Molding of a sufficiently rigid bearing post from the cassette material was not conveniently possible because of space limitations and limitations upon the thickness of parts which can be molded from a thermoplastic material without resulting in undesirable effects during cooling of the material. Furthermore, in order to minimize frictional drag and erratic rotation, a small diameter mounting post is extremely desirable.

SUMMARY OF THE INVENTION

According to the present invention, means are provided for supporting the constant speed drive capstan backup roller in a multipurpose film cassette of the type described above in a manner permitting the support to maintain the idler roller in its desired orientation for guiding the film strip while being engaged by the force imparting drive capstan. The roller supporting means comprises a mounting pin extending through an axial opening provided in the idler roller and extending beyond the extremities of the roller at each end. Structural means are adapted to engage the roller mounting pin at each end for imparting a force thereupon in a direction to resist the force imparted thereupon by the constant speed drive capstan.

In a preferred embodiment, the idler roller mounting means comprises a U-shaped bracket formed from a sheet material having an intermediate connecting leg extending substantially parallel to the axis of rotation of the roller and upper and lower legs extending above and below the roller and having suitable openings therein for receiving and supporting the idler roller mounting pin. The lower leg of the U-shaped member is attached to a sidewall of the housing by means of integrally formed protuberances from the housing wall extending through mating openings in the lower leg. The upper ends of the protuberances are deformed following positioning of the U-shaped bracket to form upset portions retaining the bracket in place. The upper leg of the U-shaped bracket includes an integrally formed projection thereof extending in a direction substantially parallel to the direction of the force imparted by the drive capstan. This integral projection engages a structural portion of the film cassette's processor wall to thereby provide a structural means for resisting the force imparted to the upper end of the idler roller mounting pin by the constant speed drive capstan.

Other objects of the invention will in part be obvious and will in part become apparent to those skilled in the art as the following description proceeds. The features of novelty which characterize the invention will be pointed out with particularity in the claims annexed to and forming part of the specification.

BRIEF DESCRIPTION OF THE DRAWINGS

For a fuller understanding of the nature and objects of the invention, reference should be made to the following detailed description taken in conjunction with the accompanying drawings wherein.

DESCRIPTION OF THE PREFERRED EMBODIMENT

Figure 1:
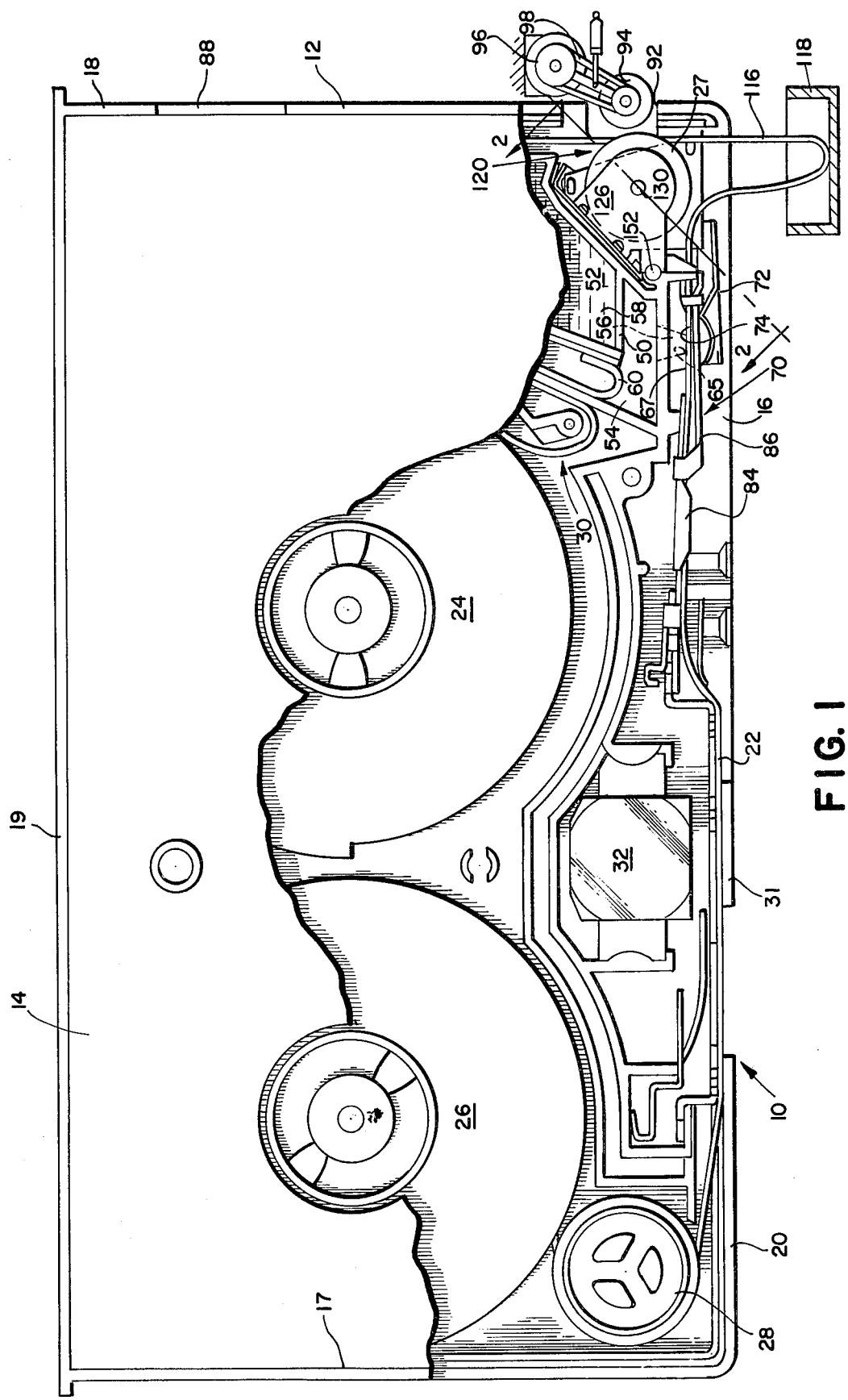
FIG. 1 is a diagrammatic view of a photographic film handling cassette incorporating the present invention.

The illustrated embodiment of the invention, which may be best understood by first referring to FIG. 1 of the drawings, employs a multipurpose film handling cassette 10 of the type described in the above-referenced U.S. Pat. No. 3,785,727 which is configured for substantially automatic processing of the film strip responsive to appropriate transport of the latter within the cassette. As shown in FIG. 1, the cassette 10 comprises a generally parallelepiped housing 12 constituted by planar faces or sidewalls 14 and 16, end walls 17 and 18, and elongated top and bottom edge walls 19 and 20. Carried within the housing 12 is a photographic film strip which is permanently attached at one of its ends to a rotatable supply spool or reel 24 from which it extends within the housing 12 in a somewhat extended path around suitable rollers, two of which, 27, 28, are shown in the drawing, to a takeup spool or reel 26 to which the opposite end of the film is attached. In its path within the housing 12, the film 22 extends past a normally inoperative film processing station 30, which is subsequently explained in detail, and across an opening 31 which functions at different times to facilitate both exposure and projection. For facilitating the latter operation, a prism 32 is mounted behind the film strip 22 and in adjoining relation to both the opening 31 and to an illumination aperture (not shown) in the sidewall 14.

In the illustrated embodiment, the processing operation is substantially controlled by the film transport program to which the cassette is subjected. This is accomplished, as later explained in more detail, by utilizing one of the film spools and the film strip itself to provide both information and energy to the processing station 30 of the cassette. Consequently, the photographic film strip 22 is designed to cooperate with operational elements of the processing system and preferably comprises a base of any suitable transparent material carrying at least over the central portion thereof an emulsion of photosensitive coating of any conventional variety as, for example, an emulsion developed by a monobath processing composition to form a positive transparency suitable for projection.

Figure 5:
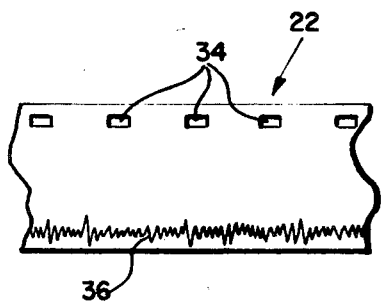
FIG. 5 is a plan view of a portion of the film strip employed in the cassette shown in FIG. 1.
Figure 5:
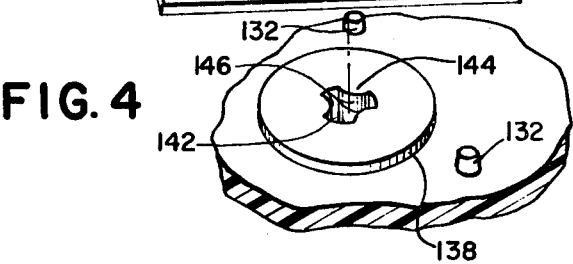

FIG. 5 illustrates a portion of the photographically useful portion of the film strip 22. Carried along one edge of the film strip are a plurality of conventional sprocket holes 38 which are configured for cooperation with a drive pawl (not shown) in either a camera or projector for incremental advancement of the film. The film strip also includes a magnetic sound track 36 provided in the vicinity of one edge thereof and which is adapted to have sound information first recorded thereon and then subsequently extracted therefrom.

Referring again to FIG. 1, a film processing station 30 generally comprises a housing 50 having a first compartment or receptacle 58 retaining a source of processing fluid 52 which, followed removal of tear tab 60, is adapted to release the fluid to a second compartment 54 which includes a coating nozzle generally designated at 56. The latter includes a nozzle opening 65 which extends from the compartment 54 to a film engaging surface 67 of the nozzle which is configured for depositing a layer (not shown) of controlled thickness of the processing fluid on the film strip 22 during the transport of the latter towards the supply spool 24, that is, in its rewind direction. Deposit of a suitable layer of the fluid 52 is facilitated by a doctor blade element which is depressed slightly below the film engaging surface 67 and which, in cooperation with the latter, and a pressure pad, described below, supplies a substantially uniform coating of fluid on the film strip 22.

Mounted beneath the applicator housing 50 is a pressure pad assembly 70. As shown in FIG. 1, the film strip 22 normally passes between the nozzle surface 67 and a raised film engaging surface 74 of the pressure pad assembly 70. The latter is mounted on and biased towards the nozzle surface 67 by a suitable spring assembly 72.

A wedge-like slide valve 84 shown in FIG. 1, is displaceably mounted in adjoining relation to a leading end of the pressure pad assembly 70 and is configured to be displaced into blocking engagement with the nozzle 65 upon completion of the processing operation. In this arrangement, the slide valve 84 carries a downwardly extending arm 86 which, at the end of the rewind operation, is configured to carry the valve to the right of the position shown in FIG. 1. This displacement forces the valve 84 into blocking engagement with the nozzle opening 65. For a more detailed description of the processing, equipment and operation thereof, reference should be made to U.S. Pat. No. 3,724,086, entitled "Photographic Apparatus Having an Improved Film Operated Processing System" of Gerald H. Cook and assigned to the assignee of the present application.

A plurality of apertures are located in cassette 10 for facilitating the introduction of an audio system into operable association with the magnetic tape portion 36 of the film strip 22. A first aperture 88 located in end wall 18 permits a magnetic recording and playback transducer head (not shown) to enter cassette 10 and contact the magnetic tape portion 36 of film strip 22. A suitable transducer head and its associated structure is claimed and described in detail in U.S. Pat. No. 3,888,570 which is assigned to the assignee of the present application. A backup plate (not shown) is located within the cassette 10 behind the film strip 22 for insuring proper engagement pressure and alignment between the transducer head and magnetic tape portion 36 of the film strip 22.

A second aperture 92 is provided at the lower right hand corner of cassette 10 (as viewed in FIG. 1) for permitting the introduction of a constant speed drive capstan 94 into cassette 10 proximate idler roller 27. The constant speed drive capstan 94 is driven, in turn, by a constant speed motor 96 via appropriate drive linkages shown generally at reference numeral 98. The capstan 94 is formed as a portion of a large flywheel (not shown) for insuring the relative unvariability of its speed.

It should also be noted that both the transducer head and capstan 94 are selectively moveable into and out of engagement with the film strip 22 and magnetic track portion 36 during the various operations performed in the camera and projector described above. The specific structure and mechanism for accomplishing these movements is claimed and described in U.S. Pat. No. 3,848,977.

While a conventional claw type film advance mechanism (not shown) may be employed for moving the film strip to the takeup reel 26, such incremental motion is not easily adapted to an audio system which requires the associated magnetic tape to pass through at a constant speed. Accordingly, the incremental motion of the advancing claw mechanism must be isolated from the transducer head (not shown) in order to achieve the degree of audio quality desirable in such motion picture systems. In order to achieve this isolation, means have been devised for automatically forming an isolation loop between the claw mechanism (not shown) and the magnetic tape transducer head (not shown). With such a system, the isolation loop is automatically formed whenever the transducer head is moved into engagement with the magnetic tape portion 36 of the film strip 22. Such an isolation loop 116 is illustrated in FIG. 1 wherein positioned near the loop 116 is an electric eye assembly 118 which monitors the loop and which instructs the drive motor (not shown) of the claw mechanism to speed up should loop 116 get too large. A sound cassette having such a capability, and sound recording and playback photographic apparatus for operating with such a cassette are described and claimed in U.S. Pat. Nos. 3,850,512 and 3,921,880, respectively, both of Donald T. Scholz and assigned to the assignee of the present invention.

Figure 2:
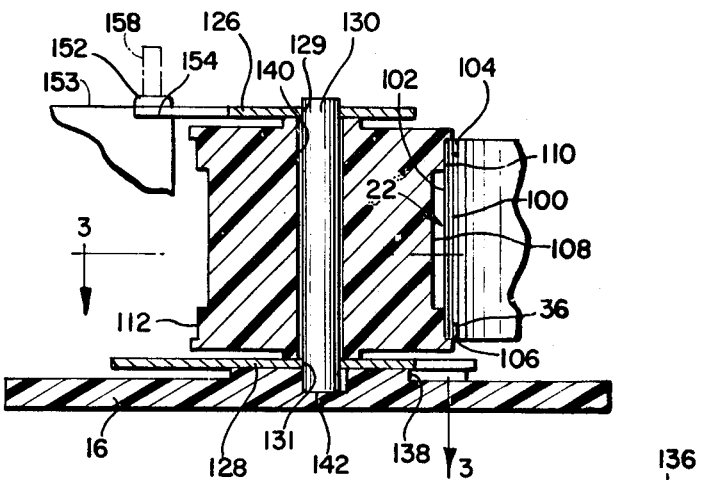
FIG. 2 is an enlarged cross-sectional view taken along the line 2—2 of FIG. 1 and additionally showing the film strip and constant speed drive capstan in driving contact with the idler roller.

Looking to FIG. 2, there is shown a detailed view of the engagement between idler roller 27, film strip 22 and the constant speed drive capstan 94 when the latter is moved into operable contact with the film strip. The film strip 22 is formed having a support layer 100, an emulsion layer 102 and a pair of long narrow strips or rails 104 and 106 located on each lateral edge of the film strip and extending the full length thereof. The magnetic sound track 36 is carried on the outward surface of the lower rail 106. Rails 104 and 106 are located on the film strip 22 for providing an air space between the emulsion layer 102 and the support layer 100 when the wet film strip is wound upon supply reel 24 directly after the processing operation. If rails 104 and 106 were not provided, the emulsion side of the film strip might possibly stick to the support layer of the next wound layer of film and impair or damage the development of the photographic image. The film strip 22 is so wound within cassette 10 such that rails 104 and 106, and consequently, the magnetic sound track 36, are directed outwardly as film strip 22 passes between an upper idler roller (not shown) and the lower idler 27. Consequently, idler 27 is formed having a centrally depressed area 108 and two stepped portions 110 and 112 proximate the lateral edges of film strip 22. Configured as such, the wet emulsion layer 102 of film strip 22 is isolated from contact with the idler 27 by the depressed area 108. The outer edges of the film strip 22 which are in contact with stepped portions 110 and 112 are not coated with the developing liquid and such contact does not affect the quality of the film strip or its image.

The constant speed drive capstan 94, when moved into engagement with the film strip 22 to sandwich the film strip between the capstan 94 and idler roller 27, contacts or engages only the rails 104 and 106 of film strip 22 and does not directly contact the idler roller 27. During audio operation, the capstan 94, the exterior of which is treated to provide a good friction drive surface, actually drives the film strip 22 and not the idler 27.

In order to achieve a positive driving engagement between the transducer 94 and the film rails 104 and 106, it has been found desirable to impart a biasing force of between 700 and 800 grams by the constant speed drive capstan 94. It has been found that prior art means for mounting the idler roller 27, i.e., typically an upwardly extending cantilevered mounting pin formed integrally with the thermoplastic material of the housing sidewall, has not been sufficient to provide an adequate structural backup for the force imparted by the constant speed drive capstan 94. Specifically, it has been found that with such a force, the cantilevered mounting pin for the idler roller 27 has been caused to bend away from the direction of the imparted capstan drive force, resulting in an askew drive which causes the film to ride out of the guiding flanges on the ilder and thereby to escape from the driving effect of the capstan.

Figure 4:
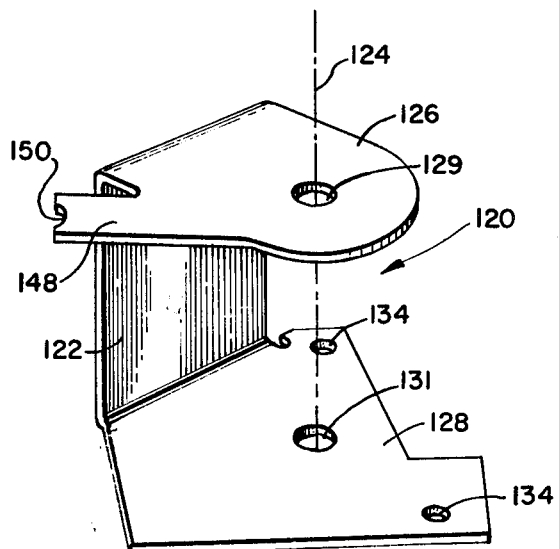
FIG. 4 is a diagrammatic prespective view of the idler roller mounting assembly and a portion of the cassette wall to which it is attached.

In accordance with the present invention, a U-shaped idler roller supporting bracket 120 is provided which is capable of imparting a supporting or resisting force on the idler roller 27 from both the upper and lower ends thereof. As best shown in FIG. 4, the U-shaped member comprises an intermediate connecting leg 122 extending substantially parallel to the axis of rotation 124 of the idler roller 27 and upper and lower legs 126, 128 respectively extending normal to the axis 124, above and below the idler roller. Each of the upper and lower legs 126, 128 of the U-shaped supporting bracket is provided with an opening 129, 131, respectively therethrough in axial alignment with the axis of rotation 124 of the idler roller 27 for receiving a small diameter, metal idler roller mounting pin 130 therethrough as will now be described in connection with the other figures.

As best seen in FIG. 1 and with reference to FIG. 4, it is seen that the configuration of the lower leg 128 of the bracket 120 is configured so as to provide a substantial mounting base for the U-shaped bracket upon the interior of the sidewall 16 of the cassette. The bracket 120 is secured to the sidewall 16 of the cassette by means of a pair of upstanding lugs 132 formed integrally with the sidewall of the cassette and adapted to pass through mating openings 134 provided in the lower leg 128 of the bracket. The pair of upstanding lugs 132 are initially sized so as to pass readily through the openings 134 and are then subjected to a suitable source of cold forming force or heat which causes the upper ends of the protuberances 132 to deform and form enlarged portions 136 which firmly retain the U-shaped bracket to the sidewall 16 of the cassette. In the illustrated embodiment, as best seen in FIGS. 2 and 4, a circular boss 138 is provided in the sidewall 16 which raises the elevation of the lower leg 128 of the U shaped bracket above the level of the interior of the sidewall 16. Such an arrangement has no functional advantage in connection with the present invention, however, is a preferred embodiment when the present invention is used in connection with an improved pressure pad spring as described and claimed in a commonly assigned U.S. patent application Ser. No. 756,596 entitled "Pressure Pad Spring for Sound Motion Picture Film Handling Cassette" by Frank Czumak filed on even date herewith.

Figure 3:
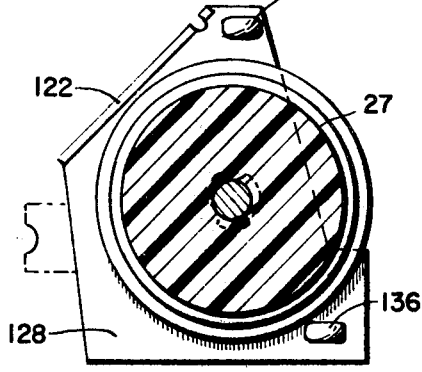
FIG. 3 is a cross-sectional plan view taken along the line 3—3 of FIG. 2.

As best seen in FIG. 2, the idler roller 27 is mounted and retained within the U-shaped bracket by means of a centrally extending pin 130 fabricated from a structurally suitable material such as stainless steel or the like. Again, as best seen in FIG. 2, the pin is adapted to pass through the opening 129 in the upper leg 126 downwardly through a central axially disposed opening 140 in the idler roller 27 and through the opening 131 in the lower leg 128. In the preferred embodiment, the pin 130 is of sufficient length to extend partially downwardly into a recess 142 provided in the side wall 16 of the cassette. This recess preferably is somewhat larger in diameter than the pin 130 and is provided with a plurality of inwardly extending ear-like members 144 which define a plurality of pin receiving surfaces, i.e., three surfaces 146 shown in FIGS. 3 and 4 which serve to receive the lower end of the pin 130 in a press fit relationship whereby upon assembly of the idler roller 27 and mounting pin 130 to the U-shaped bracket 120 and the housing 12, the pin will not fall out during handling encountered in manufacture.

As best shown in FIGS. 1 and 4, the upper leg 126 of the U-shaped bracket is provided with an integral extension thereof 148 which extends along the longitudinal axis of the cassette 10 in a direction which is also substantially parallel to the direction of the force imparted by the constant speed drive capstan 94, and which terminates in a bifurcated end 150 which is adapted to engage an upstanding post 158 and stepped surface 154 formed as an integral extension of a substantially structural wall portion of the film processor 30. In a manner similar to that used in respect to the upstanding lugs 132, a suitable source of cold forming force or heat may be applied to the upstanding post 158 to thereby form an enlarged upset portion 152 which will prohibit upward movement of the extension 148 of the upper leg and accordingly the upper leg itself.

Accordingly, it will be evident that upon engagement of the constant speed drive capstan 94 with the film strip 22 and idler roller 27 in the manner described herein-above, the force imparted thereon by the constant speed capstan will be transmitted through the film strip to the idler roller, and in turn, to the mounting pin 130 which will react the force in substantially equal proportions through the lower end of the pin 130 to the lower leg 128 and recess 142 in the side wall 16 and similarly an equal proportion by the upper leg 126 through the extension 148 thereof and its engagement with the post 152 and the stepped surface 154 to the structural wall portion 153 of the processor 30.

Accordingly, it should be appreciated that a novel means has been disclosed for rotatably supporting an idler roller in a cassette of the type described herein so that a magnetic track bearing film strip may be drivingly biased thereagainst by a constant speed drive capstan without the roller support means yielding to the force imparted thereupon by the drive capstan.

This invention may be practiced or embodied in various other ways without departing from the spirit or essential character thereof. The preferred embodiment described herein therefore is illustrative and not restrictive, the scope of the invention being indicated by the appended claims and all variations which come within the meaning of the claims are intended to be embraced therein.

What is claimed is:

1. A self-developing sound motion picture film handling cassette adapted to be mounted in a photographic apparatus and to cooperate with a constant speed drive capstan, said cassette comprising:

a housing having an opening provided therethrough to permit said constant speed drive capstan to be introduced thereinto;

a strip of photographic film coiled within said housing, said film having an intermediate longitudinal inwardly facing portion adapted to be coated with a processing fluid;

a roller formed of a substantially non-deformable plastic material engageable with said film strip as it is advanced from its coiled position within said cassette, said roller having an axial opening therethrough, the peripheral surface of said roller including a recessed portion located to be aligned with said portion of said film strip adapted to be coated with processing fluid; and means for rotatably supporting said roller adjacent said opening so that said film strip may be drivingly biased thereagainst by said drive capstan without said roller support means adversely yielding to the force imparted thereupon by the drive capstan, said supporting means comprising a metal pin extending through said axial opening in said roller and extending beyond the extremities of said roller at each axial end thereof, and structural means, including metal support members engaging said pin at each end thereof, said metal support members comprising a C-shaped member formed of sheet metal having an intermediate connecting leg extending substantially parallel to the axis of rotation of said roller and upper and lower legs extending above and below said roller, respectively, each of said upper and lower legs having an opening therein for receiving and supporting said pin;

said housing further comprising an integrally formed structural portion, disposed inwardly of said C-shaped member; and wherein said upper leg of said C-shaped member includes an integral projection thereof extending in a direction substantially parallel to the force imparted by said drive capstan and into supporting engagement with said structural portion of said housing for partially resisting the force imparted thereupon by said drive capstan.

2. The apparatus of claim 1 wherein said integral projection of said upper leg includes a bifurcated end and said cassette further comprises a processor for developing said film strip without removal of said film from said cassette and said structural portion comprises a protuberance formed integrally with said processor at substantially the same elevation as said upper leg and adapted to supportingly receive said bifurcated end therearound.

3. The apparatus of claim 2 wherein said protuberance is fabricated from a thermoplastic material and has a portion extending above said bifurcated end so that suitable deformation of said portion of said protuberance extending above said bifurcated end results in formation of an upset portion restraining said upper leg from moving upward.

4. The apparatus of claim 3 wherein said housing is fabricated from a thermoplastic material and includes a wall for supporting said C-shaped member, said wall having at least one upstanding lug formed integrally therewith and wherein said lower leg has openings formed therein located to receive each of said at least one upstanding lugs therethrough whereby suitable deformation of the upper ends of said upstanding lugs results in formation of an upset portion fastening said C-shaped member to said wall.

5. A self developing sound motion picture film handling cassette adapted to be mounted in a photographic apparatus and to cooperate with a constant speed drive capstan, said cassette comprising:
   a housing having an opening provided therethrough to permit said constant speed drive capstan to be introduced thereinto;
   a strip of photographic film coiled within said housing, said film having an intermediate longitudinal inwardly facing portion adapted to be coated with a processing fluid;
   a roller engageable with said film strip as it is advanced from its coiled position within said cassette, said roller having an axial opening therethrough, the peripheral surface of said roller including a recessed portion located to be aligned with said portion of said film strip adapted to be coated with the processing fluid;
   means for rotatably supporting said roller adjacent said opening so that said film strip may be drivingly biased thereagainst by said drive capstan without said roller support means adversely yielding to the force imparted thereupon by the drive capstan, said supporting means comprising a pin extending through said axial opening in said roller and a C-shaped structural member having an intermediate connecting leg extending substantially parallel to the axis of rotation of said roller and upper and lower legs extending above and below said roller, respectively, each of said upper and lower legs having an opening therein for receiving and supporting said pin, said lower leg of said C-shaped bracket being positively attached to an inner surface of said housing; and
   structural means within said housing for positively engaging said upper leg of said C-shaped member for partially resisting the force imparted thereupon by said drive capstan.

6. The apparatus of claim 5 wherein said roller is formed of a substantially nondeformable plastic material, said pin is formed from a metal material and, said structural member is made from a sheet metal material.

7. A self-developing sound motion picture film handling cassette adapted to be mounted in a photographic apparatus and to cooperate with a constant speed drive capstan, said cassette comprising:
   a housing having an opening provided therethrough to permit said constant speed drive capstan to be introduced thereinto, said housing being defined by a plurality of exterior walls formed from a thermoplastic material;
   a strip of photographic film coiled within said housing, said film having an intermediate longitudinal inwardly facing portion adapted to be coated with a processing fluid;
   a roller formed of a substantially non-deformable plastic material engageable with said film strip as it is advanced from its coiled position within said cassette, said roller having an axial opening therethrough, the peripheral surface of said roller including a recessed portion located to be aligned with said portion of said film strip adapted to be coated with processing fluid; and
   means for rotatably supporting said roller adjacent said opening so that said film strip may be drivingly biased thereagainst by said drive capstan without said roller support means adversely yielding to the force imparted thereupon by the drive capstan, said supporting means comprising a metal pin extending through said axial opening in said roller and extending beyond the extremities of said roller at each axial end thereof and structural means, including metal support members engaging said pin at each end thereof for resisting the force imparted thereupon by said drive capstan, said metal pin extending through said metal support member further being received in a press-fit relationship with an opening provided in the adjacent interior surface of one of said housing walls; and wherein said metal support member engaging the lower end of said metal pin is structurally attached to the same interior surface of said one housing wall.

* * * * *